3,071,601
OXIDATION OF PROPYLENE
Robert S. Aries, New York, N.Y.
(76 Ave. Paul Doumer, Paris 16, France)
Filed Apr. 5, 1957, Ser. No. 651,100
5 Claims. (Cl. 260—348.5)

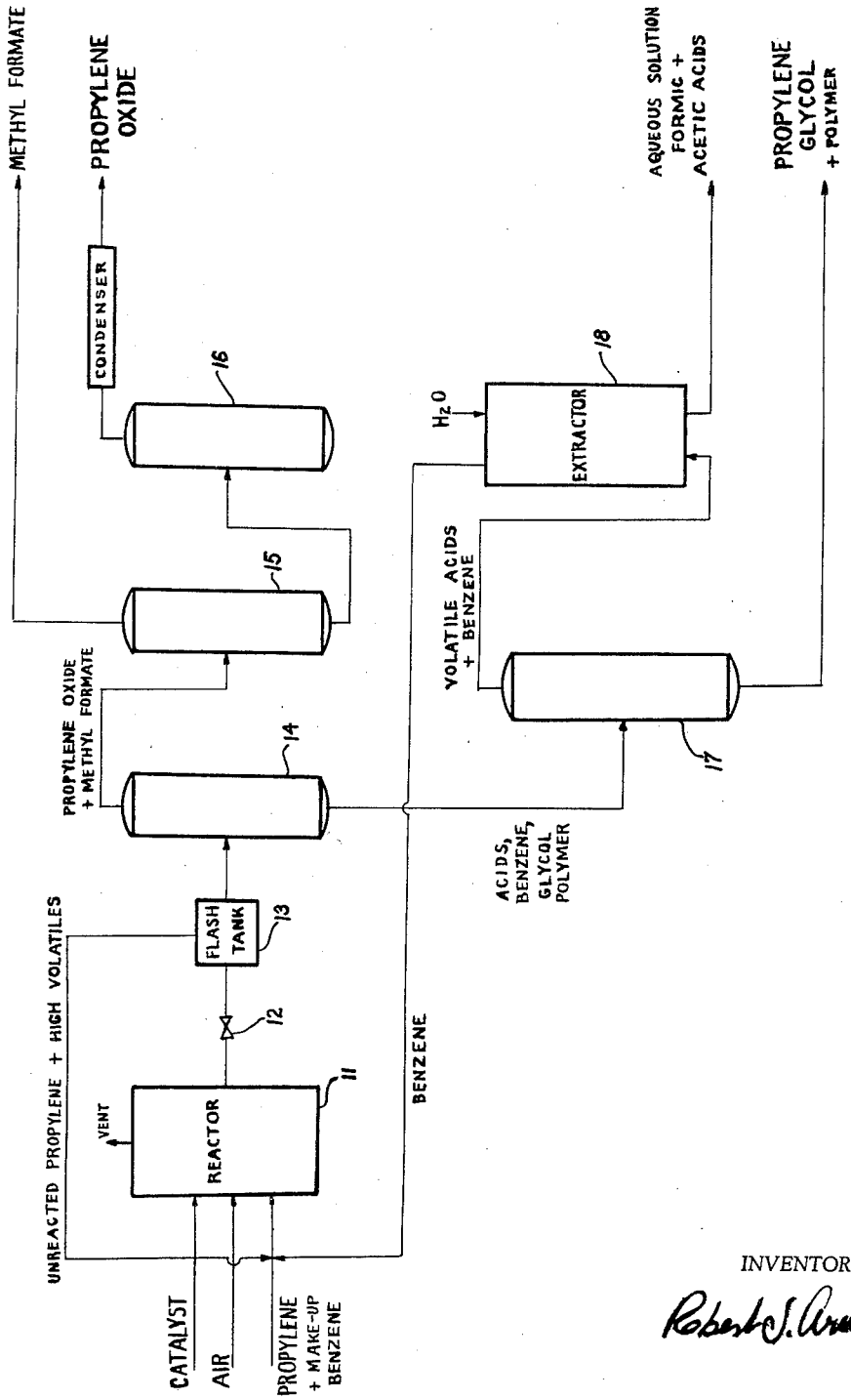

The present invention relates to the oxidation of propylene. More particularly, it relates to a novel catalytic oxidation of propylene in the liquid phase to form major amounts of propylene oxide with significant amounts of propylene glycol and lesser amounts of various acids, alcohols and polymeric products.

It has heretofore been proposed to effect the air oxidation of propylene in liquid phase in order to obtain propylene oxide. To maintain liquid conditions at the temperatures necessary for the oxidation the use of high pressures has also been necessary because of the high vapor pressure of propylene. It has also been found desirable to employ inert organic liquid diluents to dissolve the propylene, to reduce the pressures required to maintain a liquid phase containing propylene to be oxidized and to distribute the heat of the reaction evenly so as to avoid localized overheating due to the exothermic character of the oxidation.

The oxidation is difficult to control and a considerable proportion of the starting material is oxidized to acids through rupture at the double bond, some of the propylene oxide produced polymerizes, some material is additionally oxidized to carbon dioxide and water, and some of the propylene oxide is hydrolyzed to propylene glycol by the by-product water formed in the oxidation.

In order to render the process commercially practical it has been necessary to conduct extensive separation procedures to isolate the various by-products. Attempts to render the oxidation more selective through the use of conventional catalysts have proven unsuccessful since the results are substantially the same with respect to the nature of the products formed whether or not there is employed a conventional oxidation catalyst, such as the oxide or organic salts of manganese.

It is accordingly an object of the present invention to provide a novel procedure for the liquid phase oxidation of propylene preferentially to propylene oxide.

It is a further object of the invention to provide a simplified process for the separation of the end products of the oxidation.

Still another object is to provide a novel catalyst for the reaction which increases the yield of propylene oxide and propylene glycol at the expense of the carbon dioxide and other undesirable products of the oxidation.

These and other objects and advantages are realized in accordance with the present invention wherein propylene is oxidized in the liquid phase with air under conder conditions generally similar to those heretofore employed. To control the oxidation, however, there is employed a catalyst comprising a compound of a metal selected from the group consisting of cobalt, copper, manganese, vanadium and chromium as the primary oxidizing catalytic component in admixture with a compound of a member selected from the group consisting of barium and lead as promoter for the primary catalytic component. The promoter by itself in the absence of the primary catalytic component exerts little if any catalytic effect on the oxidation of propylene by air or oxygen-containing gas.

The promoter serves to speed up the oxidation so that fewer propylene molecules are ruptured with attendant formation of acids. The acceleration of the reaction also reduces the extent of complete oxidation of propylene to carbon dioxide and water. This serves to increase the yield of propylene oxide and at the same time reduces the amount of water produced by degradative oxidation and consequently present to effect hydrolysis to propylene glycol. Still another advantage resides in the fact that as compared with the complete absence of catalysts, the presence of the catalyst system permits the oxidation to be conducted at somewhat lower temperatures which also serves to decrease the yield of undesired by-products resulting from excessive oxidation.

The metal of the primary catalytic component or the promoter can be employed as the oxide, carbonate or other salt which is soluble in lower fatty acids. Since lower fatty acids are formed during the oxidation, the metal compounds will be converted to the salts of these acids so that the catalyst is probably a lower fatty acid salt of the indicated metals, whether or not these metals are added as oxides, carbonates, acetates, propionates or formates.

The catalyst, i.e., primary active material plus promoter, can be employed in an amount as great as 1% or more based on the weight of the propylene feed but little is gained by using more than 0.2% and as little as 0.01% has been found satisfactory. Of the total catalyst, from about 30 to 80 mol percent can constitute primary material, and the promoter will constitute 70 to 20 mol percent. Preferably, however, the primary material constitutes 50 to 70 mol percent of the total catalyst.

The catalyst can be added continuously during the oxidation but conveniently is added in a relatively larger amount initially and small amounts are added periodically to make up for losses by carry-over or inactivation.

With respect to the other procedural conditions, as the oxidizing agent there may be used air, or enriched air containing higher percentages of oxygen than 20%, and also depleted air containing less than 20% may be used. Enriched air tends to give higher local temperatures with increased yields of by-products while depleted air requires handling of larger volumes of inert gas, nitrogen and oxygen, so that taking into account operating costs, normal air is preferred as the oxidizing agent.

As the inert solvent, benzene has been found to be satisfactory, although other water-insoluble solvents such as cyclohexane, hexane, or heptane are also satisfactory; other hydrocarbon solvents or other solvents inert to oxidation under the operating conditions may also be used.

The raw material is preferably propylene, but propylene-propane mixtures are equally satisfactory, the propane behaving as an inert gas which can be recovered from the effluent gas stream, although minor amounts of propane may also be oxidized in the process. Other saturated hydrocarbons may be present but they offer no advantages. The presence of unsaturated hydrocarbons other than propylene is not desirable as they are oxidized and produce products which must be separated if pure propylene oxide is to be obtained. However, in special cases where ethylene oxide, for example, is desired in admixture with propylene oxide, it is possible to use as raw material propylene containing ethylene together with inert hydrocarbons such as ethane, propane, etc.

For the production of pure propylene oxide from propylene-propane mixtures it is preferred to use a raw material containing at least 40% by weight of propylene, although smaller amounts of propylene will also yield propylene oxide efficiently but will involve handling larger volumes of charging material.

The product of the oxidation reaction of the present process is a mixture of propylene oxide, propylene glycol, acetic acid, formic acid, methyl formate, alcohols ($C_1$–$C_3$), a heavy acid fraction ($C_6$–ca. $C_{20}$), a heavy non-acidic fraction ($C_6$–ca. $C_{20}$), oxides of carbon and water. However, the principal product is propylene oxide which is generally about 60–65% by weight on the propylene consumed, or roughly 43–47 mol percent on the propylene consumed. The acetic and formic acids produced can be recovered to add to the economical practice of the process, and the heavy acid and non-acid fractions may be recycled to yield products of lower boiling point such as acetic acid and formic acid, propylene oxide and propylene glycol, or these by-products may be sent to waste if it is not desired to recover them. The yields of various products are set forth in more detail in the examples given.

The process may be operated continuously, semi-continuously or batchwise. For example, the oxidation may be conducted continuously with continuous removal of propylene oxide product and recycling of the heavier fractions, while the propylene glycol, acetic acid and formic acid are recovered continuously and then separated continuously or batchwise.

A suitable reaction temperature is in the range of 150 to 250° C., but optimum results have been obtained at 200° C. ±5° C. The preferred operating pressure is 750–800 p.s.i.g., but it can be as high as 1500 p.s.i.g., as low as 100 p.s.i.g. or even lower provided it is sufficient to maintain the solvent in liquid state with the propylene dissolved therein. Since the product contains acids, corrosion-resistant equipment is desirable, and 316 stainless steel has been found satisfactory, but any suitable material may be used including glass-lined steel, especially if a somewhat lower pressure range is utilized.

The charge is benzene or other inert hydrocarbon and propylene vapor in the range of 2 to 50% by weight of propylene in the feed stock. A satisfactory ratio is 15% of propylene to 85% of benzene, but part of the benzene may be replaced by propane. Part of the advantage of using benzene is that it may easily be condensed from the effluent gas stream. The effluent gas stream can be stripped to practically zero content of unreacted propylene by activated carbon from which the propylene can be recovered substantially quantitatively for re-use while nitrogen, argon, excess oxygen, and carbon oxides are sent to waste or utilized in any desired manner.

The residence time in the reactor may be 1 minute to 1 hour, but at 200° C. and 800 p.s.i. a suitable residence time is 5 to 15 minutes, with about 10 minutes producing highly satisfactory yields.

Following completion of the reaction, or preferably continuously during the course of the reaction, a portion of the contents are withdrawn and treated to separate products from the inert solvent and unreacted propylene.

The recovery procedure which is preferred is shown schematically in the flow sheet of FIG. 1. Benzene, propylene, air and catalyst are supplied by suitable means to a high pressure reactor 11 which is heated to a temperature of about 200° C. and provided with a vent valve set to maintain a pressure of 750 p.s.i.g. in the reactor. The vent valve is set above an efficient refluxing system capable of condensing out any propylene which will be contained in the gas phase. This will require refrigeration in the top section of the condenser before the vent valve. After a residence time of about ten minutes in the reactor the liquid products pass out through a reducing valve 12 into a flash tank 13 wherein the temperature and pressure are allowed to drop to 60° C. and 65 p.s.i.g. The unreacted propylene and highly volatile oxidized and other products pass off and are recycled to the reactor 11. The liquid material within the flash tank 13 is passed to a distillation column 14 from the top of which there is distilled off the comparatively volatile propylene oxide and methyl formate, serving as feed to a further distillation column 15 wherein the methyl formate can be taken off overhead by means of an azeotrope-former such as n-pentane. The residue in column 15 is essentially propylene oxide which can be purified by distillation in column 16.

The less volatile materials recovered as the still bottoms from column 14 comprise the various acids such as acetic, formic and polymeric acids, the non-acidic polymer, the benzene diluent and the propylene glycol. By distillation in column 17 the propylene glycol is left behind together with the non-volatile polymers from which it can be separated by an aqueous extraction followed by distillation to separate the water and then to purify the glycol (not shown). The separated polymer can be recycled to the reactor in which case it will undergo depolymerization or oxidation to increase the amount of volatile acids formed. Overhead from the column 17 there comes off a mixture of volatile acids and benzene, which mixture is extracted with water in extractor 18, the benzene being recycled to the reactor 11 while the acids in aqueous solution are withdrawn.

Several runs on a laboratory scale were conducted with an apparatus generally similar to that shown in the accompanying drawing. All of the pressure part of the system must stand a working pressure of 800 p.s.i. All of the metal vessels, tubing, valves, etc. should be resistant to formic and acetic acids. 316 stainless steel is preferable.

This apparatus may be operated continuously, semi-continuously or batchwise.

For exploratory laboratory experiments a simplified arrangement of the equipment set forth in the drawing can be used. All of the pressure part of the system must be designed to operate at a working pressure of at least 800 p.s.i. All of the metal vessels, tubing, valves, etc. should be resistant to the action of liquid and vaporous formic and acetic acids. 316 stainless steel is satisfactory.

The apparatus is operated continuously. The reactor has a working height to diameter of 8:1, and is surmounted by a metal reflux condenser in three sections. The lowest section is cooled by ordinary water, the middle section by ice-water, and the top section by acetone-solid carbon dioxide to provide a temperature of −80° C. Under the system pressure of 800 p.s.i. the propylene and all material boiling higher than propylene is condensed and refluxed to the reactor. The condenser is surmounted by a vent valve set at 800 p.s.i. which releases nitrogen, carbon monoxide and carbon dioxide, and any unreacted oxygen.

The reactor is electrically heated to 200° C. measured by an inserted pyrometer. The reacting air enters at the bottom through a sparger which distributes it in fine bubbles. The system is loaded with nitrogen to 800 p.s.i. and is then heated to 200° C. Then propylene and benzene are forced in and air is supplied by a suitable high pressure pump. The propylene-benzene feed mixture is preheated after leaving the feed pump to 190–200° C. The propylene is 15% by weight of the total feed. The vent valve and pressure regulator maintains the reactor pressure at 800 p.s.i. The liquid product is released through a throttling valve set at approximately 100 p.s.i.g. which is set to allow a residence time of 10 minutes in the reactor. The stream of liquid effluent passes through a heating coil to a flash drum where the liquid is flashed to give up its content of dissolved gases and low boiling materials, those boiling below propylene oxide. The liquid is flashed in the flash drum to release vapors at 65 p.s.i.g. and 60° C. The heater for the effluent stream from the reactor is adjusted to maintain these conditions for the vapors disengaged in the flash drum, the pressure being controlled by a valve beyond the flash drum. The vapors thus released in the flash drum are returned to the reactor by suitable means. The liquid residue from the flasher is cooled by means of a cooling coil containing ice water and the liquid is then fractionated. The lower boiling fraction consists of propylene oxide and methyl formate which come off at temperatures up to 60° C. This material is cooled in an efficient condenser, and then is separately fractionated to yield methyl formate (B.P. 31.8) and propylene oxide, this being achieved by azeotroping the mixture with n-pentane (boiling point 36° C.) which carries over the methyl formate as an azeotrope below the boiling point of the propylene oxide and of the methyl formate itself. The residue is then fractionated to yield propylene oxide.

In the first fractionation, after the propylene oxide-methyl formate fraction is removed, the benzene, acetic acid and formic acid are distilled over to 130° C. The benzene-acetic acid-formic acid fraction is diluted with water to separate benzene which is returned to the feed, and the aqueous layer of acids is reserved for separation of the acids. The residue from the fractionation contains the propylene glycol which is separated by distillation, leaving a final residue of polymers which can be returned to the reactor.

In several instances the product from more than one run was used in the recovery of the liquid products.

The following examples illustrate the results achieved:

EXAMPLE

Table I shows the results obtained in several runs employing the above-described apparatus under the following conditions, the runs differing only in the catalyst proportions and compositions:

| | |
|---|---|
| Propylene charged | 496 g. |
| Propylene released at flasher | 118 g. |
| Oxygen consumed | 3.00 s.c.f. (106 g.). |
| Air consumed | 15.00 s.c.f. |
| Pressure | 760 p.s.i.g. |
| Reaction temperature | 200° C. |
| Propylene in off gas, percent vol | ca. 18%. |
| Benzene charged to reactor | 3.0 liters. |
| Air rate | 22.5 s.c.f./lb. oxide produced. |
| Reactor liquid holding time | 10 min. |

Table I

| Product | Grams | | | | |
|---|---|---|---|---|---|
| | Run 1 | Run 2 | Run 3 | Run 4 | Run 5 |
| Propylene Oxide | 265 | 190 | 312 | 307 | 298 |
| Propylene Glycol | 61 | 73 | 62 | 65 | 60 |
| Methyl Formate | 4.0 | 6 | 3.0 | 4.5 | 4.0 |
| Acetic Acid | 125 | 132 | 116 | 119 | 121 |
| Formic Acid | 121 | 140 | 121 | 116 | 110 |
| Acid Polymer | 18 | 30 | 22 | 17.5 | 18 |
| Neutral Polymer | 25 | 50 | 30 | 25 | 27 |

The compositions of the catalysts in the runs of Table I are shown in Table II:

Table II

| Run | Catalyst—Primary Component | Promoter | Mol Percent Primary Component |
|---|---|---|---|
| 1 | Cobalt acetate | none | 100 |
| 2 | None | Lead Carbonate | 0 |
| 3 | Cobalt Acetate | ____do____ | 70 |
| 4 | ____do____ | Barium Carbonate | 60 |
| 5 | Manganese Acetate | Barium Acetate | 50 |

From the foregoing comparisons it can be seen that the use of a primary catalytic material plus a promoter serves to increase the yield of propylene oxide as well as the combined yields of propylene oxide and propylene glycol without substantially altering the yield of lower acids, i.e. at the expense of the least desirable products of the reaction, viz., the carbon oxides resulting from uncontrolled excessive oxidation.

Various changes and modifications may be made without departing from the spirit and scope of the present invention and it is intended that such obvious changes and modifications be embraced by the annexed claims.

What is claimed is:

1. Process for the preparation of propylene oxide which comprises oxidizing propylene in the liquid phase in solution in a liquid hydrocarbon solvent inert to oxygen with a gas containing elemental oxygen at elevated temperature and pressure in the presence of an oxidation catalyst consisting essentially of an admixture of a primary catalytic material and a promoter, said primary catalytic material being a member selected from the group consisting of the oxide, carbonate, acetate, propionate and formate of a metal selected from the group consisting of cobalt, copper, manganese, vanadium, and chromium, and said promoter being a member selected from the group consisting of lead carbonate, lead acetate, barium carbonate, and barium acetate.

2. The process defined in claim 1, wherein the catalyst is present in an amount ranging from about 0.01 to 1% based on the weight of the propylene, the primary catalytic material constituting about 30 to 80 mol percent of the total catalyst.

3. The process defined in claim 1, wherein the catalyst is present in an amount ranging from about 0.01 to 0.2% based on the weight of the propylene, the primary catalytic material constituting about 50 to 70% of the total catalyst.

4. The process defined in claim 1, wherein the metal of the primary catalytic material is cobalt.

5. The process defined in claim 1, wherein the metal of the primary catalytic material is manganese.

References Cited in the file of this patent

UNITED STATES PATENTS

| | | |
|---|---|---|
| 2,316,604 | Loder et al. | Apr. 13, 1943 |
| 2,366,725 | Gardner | Jan. 9, 1945 |
| 2,780,634 | Robertson | Feb. 5, 1957 |
| 2,784,202 | Gardner et al. | Mar. 5, 1957 |